(No Model.)
W. B. CLEVES
TROWEL.
No. 441,135. Patented Nov. 25, 1890.
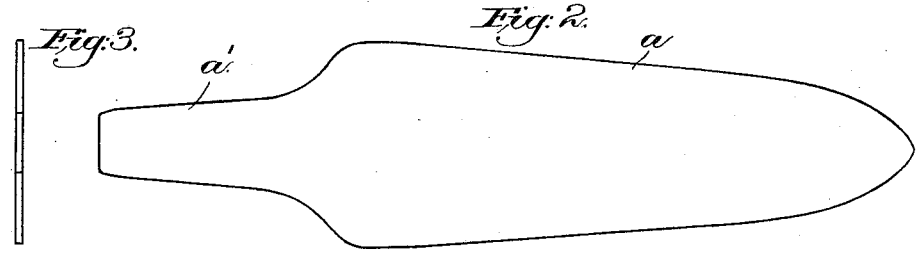
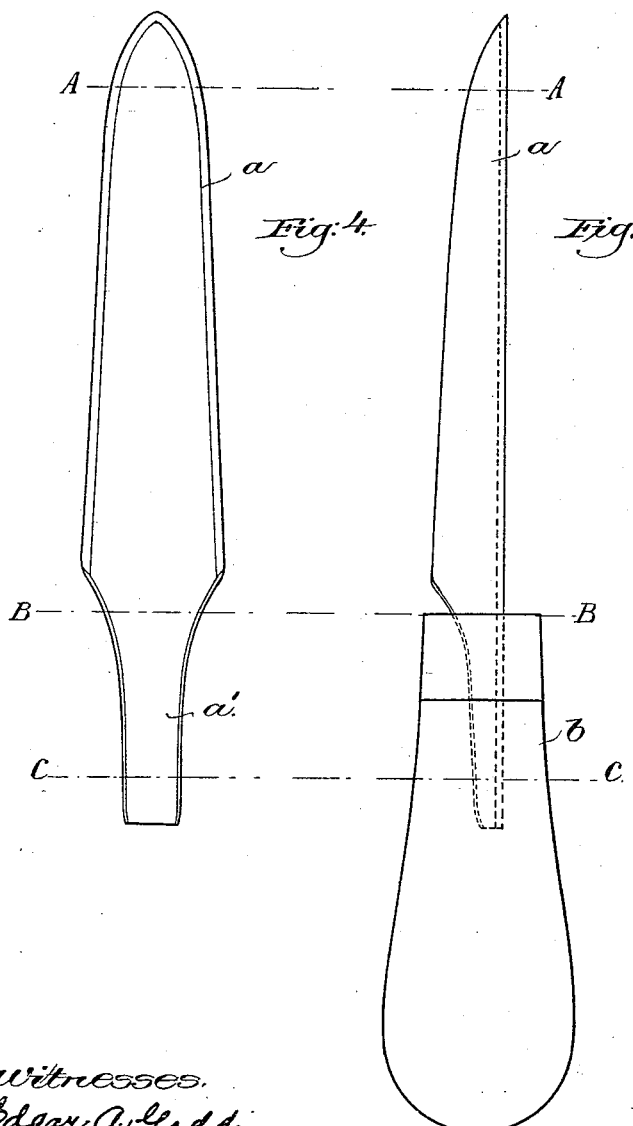
Witnesses
Edgar A. Goddin
Andrick L. Emery
Inventor
William B. Cleves,
by Crosby & Gregory
Attys.

UNITED STATES PATENT OFFICE.

WILLIAM B. CLEVES, OF BINGHAMTON, NEW YORK.

TROWEL.

SPECIFICATION forming part of Letters Patent No. 441,135, dated November 25, 1890.

Application filed December 30, 1889. Serial No. 335,318. (No model.)

*To all whom it may concern:*

Be it known that I, WILLIAM B. CLEVES, of Binghamton, county of Broome, State of New York, have invented an Improvement in Trowels, of which the following description, in connection with the accompanying drawings, is a specification, like letters on the drawings representing like parts.

This invention has for its object to construct a trowel especially adapted for digging weeds and for cultivating purposes, wherein a strong blade is desired for prying and twisting.

In accordance with this invention the blade and shank are formed from a single sheet of metal, bent in the direction of its length to form an angle, although the blade may be curved transversely and the shank formed angularly, or the blade may be angularly formed and any suitable shank provided. Any suitable handle is provided for the blade.

Figure 1 shows in side view a trowel embodying my invention; Fig. 2, a plan view; Fig. 3, an end view of the blank previous to being bent, but of a suitable shape to form the blade; Fig. 4, a front view of the blade after it has been bent; Fig. 5, a cross-section of the blade shown in Fig. 4, taken on the dotted line A A; Fig. 6, a cross-section of the trowel shown in Fig. 1, taken on the dotted line B B; and Fig. 7, a cross-section of the trowel, taken on the dotted line C C.

The blade, formed from a flat sheet-metal blank, as shown in Figs. 2 and 3, is bent or partially folded upon itself in the direction of its length to form an angular trough-shaped blade. (Best shown in Fig. 5.) The blade $a$ has a shank $a'$ formed integral with it, and also bent to correspond to the angular shape given to the blade $a$. The shank $a'$ is driven into a handle $b$, which may be of any suitable construction, and held in place by means of a pin $c$. (See Fig. 6.)

Forming the blade and shank angularly, as described, greatly strengthens it and at the same time presents a long slim blade.

It is obvious that the shank $a'$ may be formed in any suitable manner; but the angular form shown I deem preferable on account of its great strength, and even should the blade $a$ be curved instead of angular, as shown, the angular shank would still be a desirable feature.

The trowel herein described may be employed for general cultivating purposes, but is especially adapted for digging plantains and other weeds having fibrous roots of great strength, and the particular form preferably employed increases the strength and decreases the weight.

I claim—

1. In a trowel, a blade and shank integral therewith, formed from a sheet-metal blank bent upon itself to form an angular longitudinally straight trough-shaped shank, substantially as described.

2. In a trowel, a straight blade and a shank integral therewith, formed from a sheet-metal blank folded to form an angular longitudinally straight trough-shaped blade and shank, the shank being adapted to be driven into a handle, substantially as described.

In testimony whereof I have signed my name to this specification in the presence of two subscribing witnesses.

WILLIAM B. CLEVES.

Witnesses:
A. B. ORD,
I. M. CORNWELL.